Nov. 13, 1962  J. FAJANS  3,063,332
ANGLE MEASURING MECHANISM
Filed April 28, 1960  2 Sheets-Sheet 1
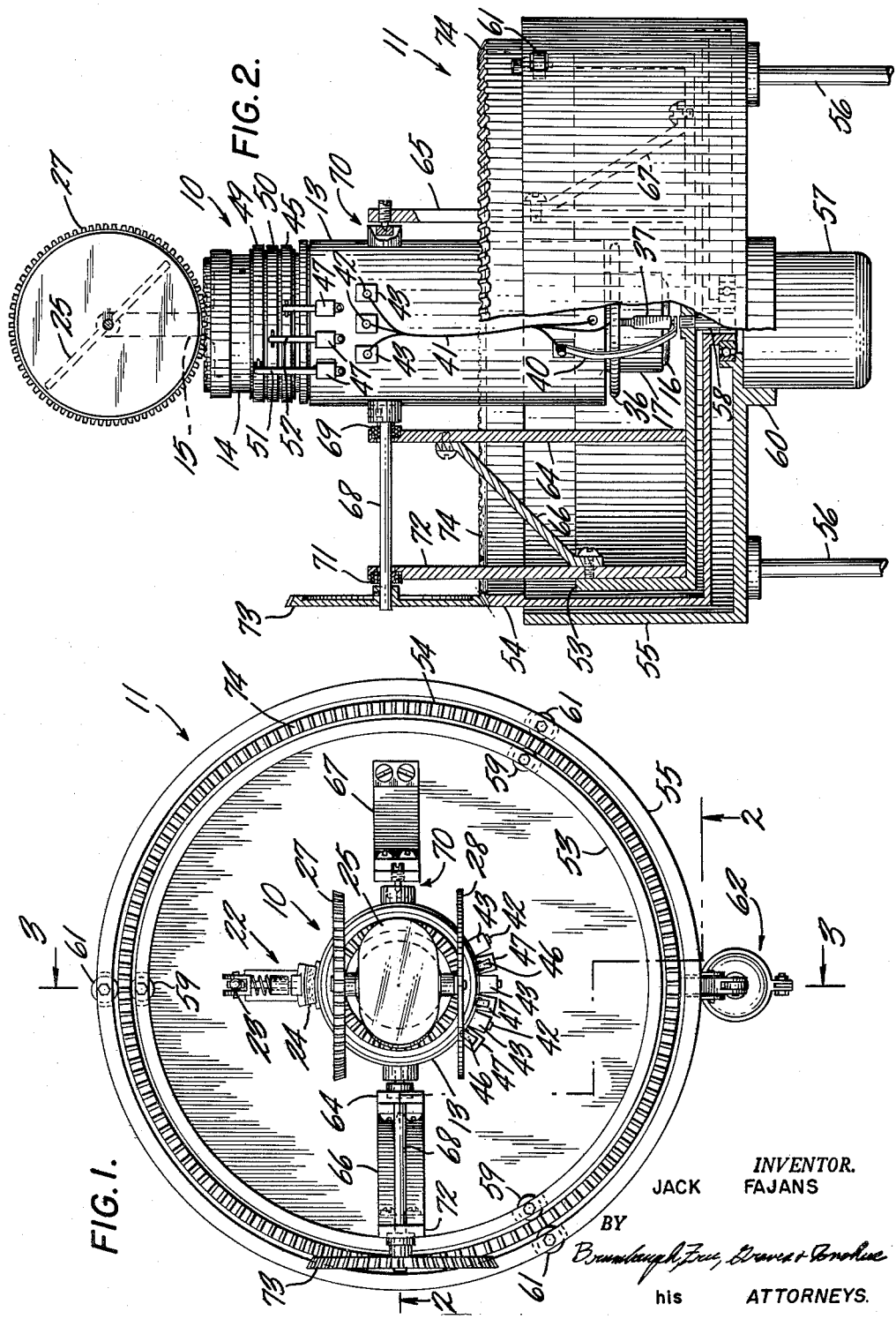
INVENTOR.
JACK FAJANS
BY
his ATTORNEYS.

Nov. 13, 1962                    J. FAJANS                    3,063,332
                         ANGLE MEASURING MECHANISM
Filed April 28, 1960                                         2 Sheets-Sheet 2

INVENTOR.
JACK FAJANS
BY
his ATTORNEYS.

United States Patent Office 3,063,332
Patented Nov. 13, 1962

3,063,332
ANGLE MEASURING MECHANISM
Jack Fajans, Douglaston, N.Y., assignor to Electrokinetics Corporation, Florham Park, N.J., a corporation of New York
Filed Apr. 28, 1960, Ser. No. 25,277
10 Claims. (Cl. 88—2.4)

This invention relates to mechanisms for making angular measurements and, more particularly, to a mechanism for automatically measuring the angular distance between two intersecting lines in space.

Conventional mechanisms for measuring the angular distance between two lines in space drawn to two distant objects, such as stars, are relatively cumbersome and complicated. Usually, they require two sets of measurements, one set to determine the azimuth and elevation of one object and a second set to determine the azimuth and elevation of the second object, and a computing device to compute the angle between these two objects on the basis of these determinations. These mechanisms have a further disadvantage in that they have a relatively high product of inertia, which is due to the fact that they are relatively large and cumbersome. This is important when they are mounted on gimbals because of the high reaction forces produced.

Accordingly, it is a purpose of this invention to provide a mechanism for making angular measurements which does not have the above-described disadvantages. In a preferred embodiment of the invention, this mechanism includes coaxial inner, middle and outer members, said inner member being rotatably mounted within said middle member about their axis and said middle member being rotatably mounted within said outer member about their axis, releasable brake means coupling said middle and outer members together, drive means for rotating said inner and middle members relative to said outer member, a reflector pivotally mounted on said inner member about an axis which is transverse to the axis of said three members, means for tilting said reflector an amount proportional to the amount of rotation of said inner member relative to said middle member, and means for indicating the amount of rotation of said middle member relative to said outer member and the amount of rotation of said inner member relative to said outer member.

In another embodiment of the invention, an apparatus is provided to vary the orientation of the axis of these three members. This apparatus includes three coaxial inner, outer and middle parts, means for rotatably mounting said inner part within said middle part about their axis and means for rotatably mounting said middle part within said outer part about their axis, drive means for rotating said inner and middle parts relative to said outer part, releasable brake means connecting said middle and outer parts, means for pivotally mounting said outer member of said angle measuring mechanism on said inner part about an axis that is transverse to the axis of said three parts, and means for tilting said outer member an amount proportional to the amount of rotation of said inner part relative to said middle part.

This invention can be more completely understood from the following detailed description of a representative embodiment of the invention taken in conjunction with the accompanying figures of the drawings in which:

FIGURE 1 is a view of a mechanism for making angular measurements constructed in accordance with the invention;

FIGURE 2 is a view taken along the line 2—2 of FIGURE 1;

Figures 3, 4:
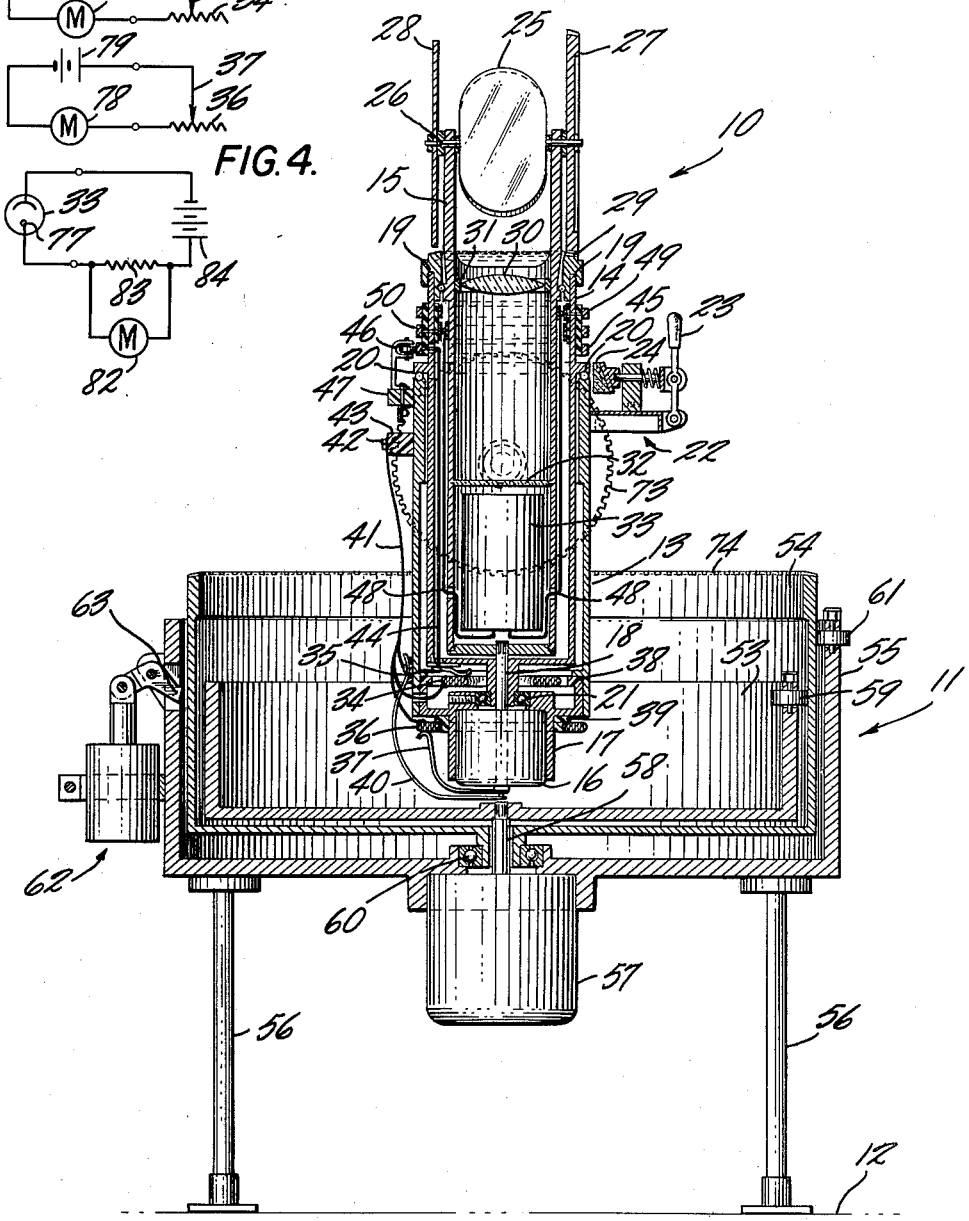
FIGURE 3 is a view taken along the line 3—3 of FIGURE 1.
FIGURE 4 illustrates schematically the electrical circuits for the mechanism.

The angle measuring mechanism includes an inner sub-assembly 10 that is pivotally mounted within an outer main assembly 11. The main assembly 11 is mounted on a stable platform 12 and is provided for the purpose of aligning the axis of the sub-assembly 10 with a reference line that may or may not pass through a luminous object. In the following discussion, it is assumed that the axis of the sub-assembly 10 is pre-aligned with a reference line that is perpendicular to the plane of the stable platform 12. While in this position, the inner sub-assembly 10 determines the angular distance between this reference line and an object line in space that is drawn to a luminous object such as a star.

The inner sub-assembly 10 includes an outer cylinder 13, a middle cylinder 14 and an inner cylinder 15, FIG. 3. An electric motor 16 is secured to a housing 17 formed at the base of the outer cylinder 13, and the inner cylinder 15 is fixed at its base to the shaft 18 of the motor 16. The inner cylinder 15 is also supported in a rotatable manner within the middle cylinder 14 by ball bearings 19. The middle cylinder 14 is rotatably mounted in the outer cylinder 13 by ball bearings 20 near its upper end and by ball bearings 21 at its base.

Mounted on the outer cylinder 13 is a brake mechanism 22 that includes a handle 23 which is adapted to force a brake pad 24 tightly against the middle and outer cylinders 13 and 14, thereby locking them together. It should be understood that instead of a manually operated brake of the type shown, a conventional solenoid actuated brake or any other type can also be used.

Pivotally mounted at the upper end of the inner cylinder 15 on a shaft 26 is a full silvered mirror 25. Also mounted on this shaft 26 are a beveled ring gear 27 and a counterbalancing weight 28. The ring gear 27 is adapted to mesh with gear teeth 29 formed in the upper edge of the middle cylinder 14. The inner cylinder 15 also supports a convex objective lens 30 that is mounted in a ring 31, a clear glass pane 32, and a light-sensitive electrical device 33 such as a photoemissive cell.

The electrical components designed to measure the relative positions of the three cylinders include a first potentiometer that has a resistance element 34 and wiper 35, and a second potentiometer that has a resistance element 36 and a wiper 37. The resistance element 34 of the first potentiometer is fixed to an insulating member 38 on the outer cylinder 13, and the wiper 35 of this potentiometer is fixed to an insulating member on the middle cylinder 14. It can be seen that when current flows through the wiper 35 and the resistance element 34, the magnitude of the resistance drop across these two elements will indicate the amount that the cylinder 14 has been rotated relative to the cylinder 13.

The resistance element 36 of the second potentiometer is fixed to an insulating member 39 on the outer cylinder 13, and the wiper 37 of this potentiometer is fixed to the shaft 18 of the motor 16. Since the shaft 18 is fixed to the inner cylinder 15, the resistance drop across this potentiometer indicates the relative positions of the outer cylinder 13 and the inner cylinder 15.

Electrical contact is made with the wiper 37 by a spring contact 40 which is fastened to the outer member 13 and has a point contact that presses against the center of the shaft 18 and the wiper 37. The resistance elements 34 and 36 and the spring contact 40 are electrically connected by a plurality of electrical conductors 41 to terminal members 42 mounted on a plurality of insulating blocks 43 that are secured to the outer cylinder 13. An electrical connection is made between the wiper 35 of the first potentiometer and a ring 45 that is mounted on the middle cylinder 14 by a conductor 44. A spring contact 46 is mounted on the outer cylinder 13 by an insulating block 47 and bears against the ring 45.

The light-sensitive electrical device 33 is electrically connected by a pair of conductors 48 to two rings 49 and 50 mounted on the middle cylinder 14. Two spring contacts 51 and 52, FIG. 2, are mounted on insulating blocks 47 on the outer cylinder 13 and make electrical contact with these two rings 49 and 50. The photosensitive member 77, FIG. 4, in the device 33 is positioned at the focal point of the objective lens 30, so that light rays entering the inner cylinder 15 will be focused on this member. It is preferred that either this photosensitive member 77 be made relatively small or a cover be provided for it that has a small aperature.

Assuming that the common axis of the three cylinders 13, 14 and 15, which is also the optical axis of the subassembly 10, has been aligned with a reference line, the angular distance between this reference line and a line drawn to an object star can be determined in the following manner: The plane of the mirror 25 is first set at a predetermined angle relative to the axis of these cylinders by locking the two cylinders 13 and 14 together, using the brake 22, and running the motor 16. The shaft 18 and the inner cylinder 15 rotate relative to the middle and outer cylinders and the ring gear 27 runs around the gear teeth 29, which causes the mirror 25 to tilt.

After this mirror is set at a desired angle relative to the reference line, as indicated by a calibrated meter 78, FIG. 4, connected in series with a potential source 79 and the resistance element 36 and wiper 37, the brake 22 is released which allows the inner and middle cylinders to rotate relative to the outer cylinder 13. Further rotation of the inner cylinder 15, by the motor 16, causes both the inner cylinder 15 and the middle cylinder 14 to rotate at the same rate because of the frictional drag between these two cylinders. It can be seen that the mirror 25 will remain at the desired angle and will scan a conical surface in space, with the mirror being at the apex of the cone. The light rays impinging on the mirror 25 are reflected into the inner cylinder 15 where they are focused by the objective lens 30 on the photo-sensitive member 77.

If the object star is on the conical surface being scanned, the inner and middle cylinders are rotated until this star is brought into focus and then stopped. A calibrated meter 80 connected in series with a potential source 81 and the resistance element 34 and wiper 35 indicates the azimuthal angle of this object star relative to a fixed geographical line running through the mechanism. In order to tell when the object star is brought into focus, a meter 82 is connected across a fixed resistor 83 which is connected in series with a potential source 84 and the photo sensitive element 33. A maximum reading on the meter 82 indicates maximum current flowing through the resistor 83 due to light from the object star reaching the element 33.

If the object star is not on the conical surface scanned at the first setting of the mirror 85, the angle of the mirror is changed by again locking the middle and outer cylinders together using the brake 22 and running the motor 16. When the tilt of the mirror 25 is changed by the desired amount, the brake 22 is released which allows the inner and middle cylinders to rotate together and scan another conical surface. This process is repeated until the object star is brought into focus.

The outer main assembly 11 is provided so that the axis of the inner sub-assembly 10 can be aligned with reference lines having different angles relative to the stable platform 12. This main assembly 11 includes an inner barrel 53, a middle barrel 54, and an outer barrel 55, the outer barrel 55 being mounted on stilts 56 that are fastened to the stable platform 12. An electric motor 57 is fixed to the base of the outer barrel 55 and has its shaft 58 fastened to the base of the inner barrel 53. This inner barrel 53 is supported by this shaft 58 and is maintained in position in the middle barrel 54 by three symmetrically positioned rollers 59, FIG. 1. The middle barrel 54 is supported by ball bearings 60 on the outer barrel 55 and is maintained in position in the outer barrel by three symmetrically positioned rollers 61.

A solenoid actuated brake 62 is mounted on the outer barrel 55 and includes a brake pad 63 that locks the outer and middle barrels together when the solenoid is energized.

The sub-assembly 10 is mounted on the inner barrel 53 of the outer main assembly 11 by two rigid members 64 and 65, FIG. 2, that are fixed to the bottom of the inner barrel. Two struts 66 and 67 are fastened to the members 64 and 65 and to the inner barrel for added strength. One side of the outer cylinder 13 of the subassembly 10 is pivotally mounted on the member 64 by a shaft 68 that is fixed to the outer cylinder 13 and is mounted in ball bearings 69 in the member 64. The other side of the outer cylinder 13 is pivotally mounted on the member 65 by a point contact coupling 70. The shaft 68 is also rotatably mounted by ball bearings 71 in a brace 72 that is fixed to the inner barrel 53. A bevel ring gear 73 is fastened to the end of the shaft 68 and meshes with gear teeth 74 formed in the upper edge of the middle barrel 54 of the main assembly 11.

To align the axis of the sub-assembly 10 with a reference line that is drawn to a reference star and is not perpendicular to the plane of the stable platform 12, prior to making an angular measurement, the mirror 25 is first positioned so that its plane is parallel to the axis of the sub-assembly 10. The solenoid actuated brake 62 is then energized which locks the middle and outer barrels together. When the motor 57 is energized the inner barrel 53 rotates relative to the middle and outer barrels which causes the ring gear 73 to run around the gear teeth 74 formed on the edge of the middle barrel 54. This action causes the shaft 68 and the axis of the three cylinders 13, 14 and 15 making up the sub-assembly 10 to tilt a predetermined amount. Subsequently, the brake 62 is de-energized and the motor 57 is again energized. This causes the inner and middle barrels to rotate at the same rate and the inclined axis of the sub-assembly 10 to scan a conical surface. If the reference star is on this surface, light rays from it pass into the inner cylinder 15 where they are focused by the objective lens 30 on the photo-sensitive member 77.

If the reference star is not on this surface, the axis of the sub-assembly 10 is tilted to a different angle in the manner described and another conical surface is scanned. Once the axis of the sub-assembly 10 has been aligned with the reference line, it remains at this position while the motor 16 and brake 22 of the subassembly 10 are actuated in order to locate the object star in the manner previously described.

It is apparent that the mechanism described herein can be operated effectively without the main assembly 11. The axis of the sub-assembly 10 can be fixed on a reference line by mounting the outer cylinder 13 on supports that are fixed to the stable platform 12. The orientation of any other line can then be determined relative to this fixed reference line. It is preferred that the axis of the sub-assembly 10 be fixed in a vertical position, however, since this permits a maximum reduction in the products of inertia.

While it is preferred that the mechanism be in a vertical position, it is apparent that by slight modification, one or both of the assemblies can be constructed so that they can be tilted to any angle desired, which would make the mechanism better suited for mounting in moving objects such as aircraft, rockets, balloons, etc.

While a representative embodiment of the present invention has been shown and described for purposes of illustration, it is apparent that the embodiment is susceptible of change and modification without departing from the invention in its broader aspects. Therefore, the invention described herein is not to be construed as limited to the specific embodiment described but is intended to encompass all modifications thereof coming within the scope of the following claims.

I claim:
1. A mechanism for measuring the angular distance between a reference line and an object line comprising coaxial outer, middle and inner members, said inner member being rotatably mounted within said middle member and said middle member being rotatably mounted within said outer member, releasable brake means coupling said middle and outer members, drive means adapted to rotate said inner and middle members relative to said outer member when said brake means is released and to rotate said inner member relative to said middle and outer members when said brake means is operative, a reflector pivotally mounted on said inner member about an axis which is substantially transverse to the axis of said three members, and means operatively coupled to said reflector and responsive to relative rotation of said inner member and said middle member for tilting said reflector an amount proportional to the amount of rotation of said inner member relative to said middle member.

2. A mechanism of the type described in claim 1 and further including means connected to said outer member for adjusting the axis of said three members relative to a stable platform.

3. A mechanism for measuring the angular distance between a reference line and an object line comprising coaxial outer, middle and inner members, said inner member being rotatably mounted within said middle member and said middle member being rotatably mounted within said outer member, releasable brake means coupling said middle and outer members together, drive means adapted to rotate said inner and middle members relative to said outer member when said brake means is released and to rotate said inner member relative to said middle and outer members when said brake means is operative, a reflector pivotally mounted on said inner member about an axis which is transverse to the axis of said three members, means for tilting said mirror an amount proportional to the amount of rotation of said inner member relative to said middle member comprising first gear means fixed to said pivotally mounted reflector, and second gear means formed on said middle member which mesh with said first gear means.

4. A mechanism of the type described in claim 3 and further including potentiometer means connected between said inner and outer members for indicating the relative angular positions of said inner and outer members, and second potentiometer means connected between said middle and outer members for indicating the relative angular positions of said middle and outer members.

5. A mechanism of the type described in claim 4 and further including means connected to said outer member for adjusting the inclination of the axis of said three members relative to a stable platform.

6. A mechanism of the type described in claim 4 and further including a convex lens positioned in said inner member and a light-sensitive electrical element positioned in said inner member at the focal point of said lens.

7. A mechanism for measuring the angular distance between two lines in space comprising coaxial outer, middle and inner members, said inner member being rotatably mounted within said middle member and said middle member being rotatably mounted within said outer member, relasable brake means coupling said middle and outer members, drive means connected to said inner member adapted to rotate said inner member relative to said outer member about the axis of said three members, a mirror pivotally mounted on said inner member about an axis substantially transverse to the axis of said three members, gear means connecting said pivotally mounted mirror with said middle member which is adapted to tilt said mirror an amount proportional to the rotation of said inner member relative to said middle member, a convex lens mounted within said inner member, a light-sensitive electrical element mounted in said inner member at the focal point of said lens, means coupling said outer and inner members together for indicating the relative angular positions of these two members, and means coupling said outer and middle members together for indicating the relative angular positions of these two members.

8. A mechanism of the type described in claim 7 and further including means for adjusting the inclination of the axis of said three members relative to a stable platform.

9. A mechanism of the type described in claim 8 wherein said inclination adjusting means includes coaxial inner, middle and outer barrels, said inner barrel being rotatably mounted within said middle barrel and said middle barrel being rotatably mounted within said outer barrel, means for mounting said outer barrel on a stable platform, means for releasably locking said middle and outer barrels together, drive means connected to said inner and outer barrels in such a manner that said inner barrel can be rotated relative to said outer barrel, means for pivotally mounting said outer member within said inner barrel about an axis that is transverse to the axis of said three barrels, and means coupling said outer member with said middle barrel in such a manner that said outer member is pivoted when said inner barrel is rotated relative to said middle barrel.

10. A mechanism for measuring the angular distance between a reference line and an object line comprising coaxial outer, middle and inner members, said inner member being rotatably mounted within said middle member and said middle member being rotatably mounted within said outer member, releasable brake means coupling two of said coaxial members, drive means adapted to rotate one of said two coaxial members and a third one of said coaxial members relative to the other of said two coaxial members when said brake means is released and to rotate said third one of said coaxial members relative to said two coaxial members when said brake means is operative, a scanning device pivotally mounted on one of said coaxial members about an axis which is substantially transverse to the axis of said three members, and means operatively coupled to said scanning means and responsive to rotation of said third coaxial member relative to said one of said two coaxial members for pivoting said scanning means an amount proportional to the amount of rotation of said third coaxial member relative to said one of said two coaxial members.

References Cited in the file of this patent
UNITED STATES PATENTS
2,839,689    Trinite _____ June 17, 1958